(12) United States Patent
Kathail et al.

(10) Patent No.: US 11,652,824 B2
(45) Date of Patent: *May 16, 2023

(54) TRUSTWORTHINESS EVALUATION OF NETWORK DEVICES

(71) Applicant: Cisco Technology, Inc., San Jose, CA (US)

(72) Inventors: Pradeep Kumar Kathail, Los Altos, CA (US); Eric Voit, Bethesda, MD (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/669,123

(22) Filed: Feb. 10, 2022

(65) Prior Publication Data

US 2022/0166779 A1    May 26, 2022

Related U.S. Application Data

(63) Continuation of application No. 16/715,271, filed on Dec. 16, 2019, now Pat. No. 11,283,812.

(Continued)

(51) Int. Cl.
*H04L 29/06* (2006.01)
*H04L 12/24* (2006.01)
(Continued)

(52) U.S. Cl.
CPC ........ *H04L 63/108* (2013.01); *H04L 41/0803* (2013.01); *H04L 63/0876* (2013.01); *H04L 63/20* (2013.01)

(58) Field of Classification Search
CPC ....... H04L 63/20; H04L 63/10; H04L 63/105; H04L 63/108; H04L 63/0876; H04L 41/0803
(Continued)

(56) References Cited

U.S. PATENT DOCUMENTS

| 8,726,344 | B1 * | 5/2014 | Amidon ................ H04L 63/107 713/168 |
| 10,812,521 | B1 * | 10/2020 | Sharifi Mehr ...... H04L 63/1433 |
| 2007/0101418 | A1 | 5/2007 | Wood et al. |
| 2010/0005179 | A1 * | 1/2010 | Dickson .................. H04L 63/30 709/228 |

(Continued)

FOREIGN PATENT DOCUMENTS

WO    2017075410 A1    1/2010

OTHER PUBLICATIONS

International Search Report and Written Opinion from the International Searching Authority, dated Jun. 18, 2020, 10 pages, for corresponding International Patent Application No. PCT/US2020/026367.
Seward, Kim, "College Algebra, Tutorial 58: Probability," May 2011, West Texas A&M University, 2011, 23 pages.

*Primary Examiner* — Ruolei Zong
(74) *Attorney, Agent, or Firm* — Polsinelli

(57) ABSTRACT

Systems, methods, and computer-readable media for evaluation of trustworthiness of network devices are proposed. In one aspect, a first network device can determine a first determine a first probability of a security compromise of a second network device based on visible indicators. The first network device can also determine a second probability of the security compromise of the second device based on invisible indicators. The first network device also determines a trust degradation score for the second network device and establishes, based on the trust degradation score, a specified type of communication session with the second network device.

20 Claims, 8 Drawing Sheets

Related U.S. Application Data

(60) Provisional application No. 62/828,880, filed on Apr. 3, 2019.

(51) Int. Cl.
*H04L 9/40* (2022.01)
*H04L 41/0803* (2022.01)

(58) Field of Classification Search
USPC .............................................. 726/4
See application file for complete search history.

(56) References Cited

U.S. PATENT DOCUMENTS

| | | | |
|---|---|---|---|
| 2015/0365436 A1* | 12/2015 | Shenefiel | H04L 63/123 |
| | | | 726/1 |
| 2016/0191532 A1* | 6/2016 | Seiver | H04L 43/0876 |
| | | | 726/4 |
| 2017/0374094 A1* | 12/2017 | Agarmore | H04L 63/1441 |
| 2018/0034845 A1* | 2/2018 | Diebenbusch | H04L 63/1408 |
| 2019/0089720 A1* | 3/2019 | Aditham | G06F 16/9014 |
| 2019/0166125 A1* | 5/2019 | Bender | H04L 63/02 |
| 2019/0238582 A1* | 8/2019 | Sauve | H04L 63/1433 |
| 2019/0373471 A1* | 12/2019 | Li | H04L 63/0853 |
| 2020/0250958 A1* | 8/2020 | Wilson | G08B 13/248 |
| 2020/0314133 A1* | 10/2020 | Singh | G06F 21/604 |

* cited by examiner

| Host Attack Vector | Section | Evidence Log | Useful Config | Root Event Messaging |
|---|---|---|---|---|
| Application | Runtime Δ | App executable modified | file signature @ load | rolling hash (evidence) | |
| | | App runtime config modified | event log | rolling hash (failed mem checks) | SYSLOG* |
| | | Unexpected outbound connections | event log | rolling hash (evidence) | |
| | File System Δ | App file modified | event log | rolling hash (evidence) | |
| | Vulnerabilities | Scanning / footprinting | event log | hash (directory struct) | |
| | | Parameter injection from peer | event log | | |
| Linux / Infra | Runtime Δ | OS runtime modified | file signature @ load | rolling hash (evidence) | Grub-kernel |
| | | OS current config modified | event log | rolling hash (failed mem checks) | |
| | File System Δ | OS file modified | file signature @ disk | hash (directory struct) | Linux |
| | Command Line | Parallel executable added | directory* | hash (evidence) | |
| | | File system permissions | directory* | hash (evidence) | |
| | | Parallel executable loaded | process list* | rolling hash (evidence) | SYSLOG* |
| | | Shell access | event log | rolling hash (evidence) | |
| | System Calls | Privilege Escalation | event log | rolling hash (evidence) | |
| | | Joining namespace | event log | rolling hash (evidence) | |
| | | Fork/clone process | inventory | hash (evidence) | |
| Hardware | | Swapout pre boot | inventory | rolling hash (evidence) | hw specific |
| | | Added to system | inventory | rolling hash (evidence) | |
| | | Firmware Δ | values* | rolling hash (evidence) | UEFI |
| | | Register memory Δ | | | |

FIG. 5

TRUSTWORTHINESS EVALUATION OF NETWORK DEVICES

CROSS-REFERENCE TO RELATED APPLICATIONS

This application is a continuation of U.S. Non-Provisional patent application Ser. No. 16/715,271, filed Dec. 16, 2019, which claims the benefit of U.S. Provisional Patent Application No. 62/828,880, filed Apr. 3, 2019, the contents of which are incorporated herein by reference in their entireties.

TECHNICAL FIELD

The present disclosure generally relates to the field of computer networking, and more particularly, to systems and methods for assessing reliability and trustworthiness of various devices operating within a network.

BACKGROUND

Trustworthiness of a given device operating within a network may degrade from the time of its initial configuration. Active measurements may be needed to validate that a device is equivalently trustworthy to the time of its initial deployment. New technologies such as TPM, Aikido, and Canary Stamps are adding capabilities which support the secure, real-time reporting of active trustworthiness measurements/evaluation from a remote device.

Based on the results from such technologies, additional analysis and remediation methods can be invoked to reduce/mitigate the effects of attacks. For example, an Integrity Verification application based on a controller can validate specific portions of device memory. When errors are found during such a check, it allows the Integrity Verification application to implement steps in order for a device to be returned to a good state.

Such memory verification checks are expensive however and such checks by themselves imply that a device is more likely to be in a good state soon after device validation, and less likely to be in a good state just before a device validation. The result of this implication is that it should be possible to use historical and operational data to quantify and graph the likelihood of compromise for a specific device since the last device validation.

BRIEF DESCRIPTION OF THE FIGURES

To provide a more complete understanding of the present disclosure and features and advantages thereof, reference is made to the following description, taken in conjunction with the accompanying drawings, in which:

FIG. 5 illustrates an example table of visible and non-visible indicators defined above, according to an aspect of the present disclosure;

DETAILED DESCRIPTION

Figure 1:
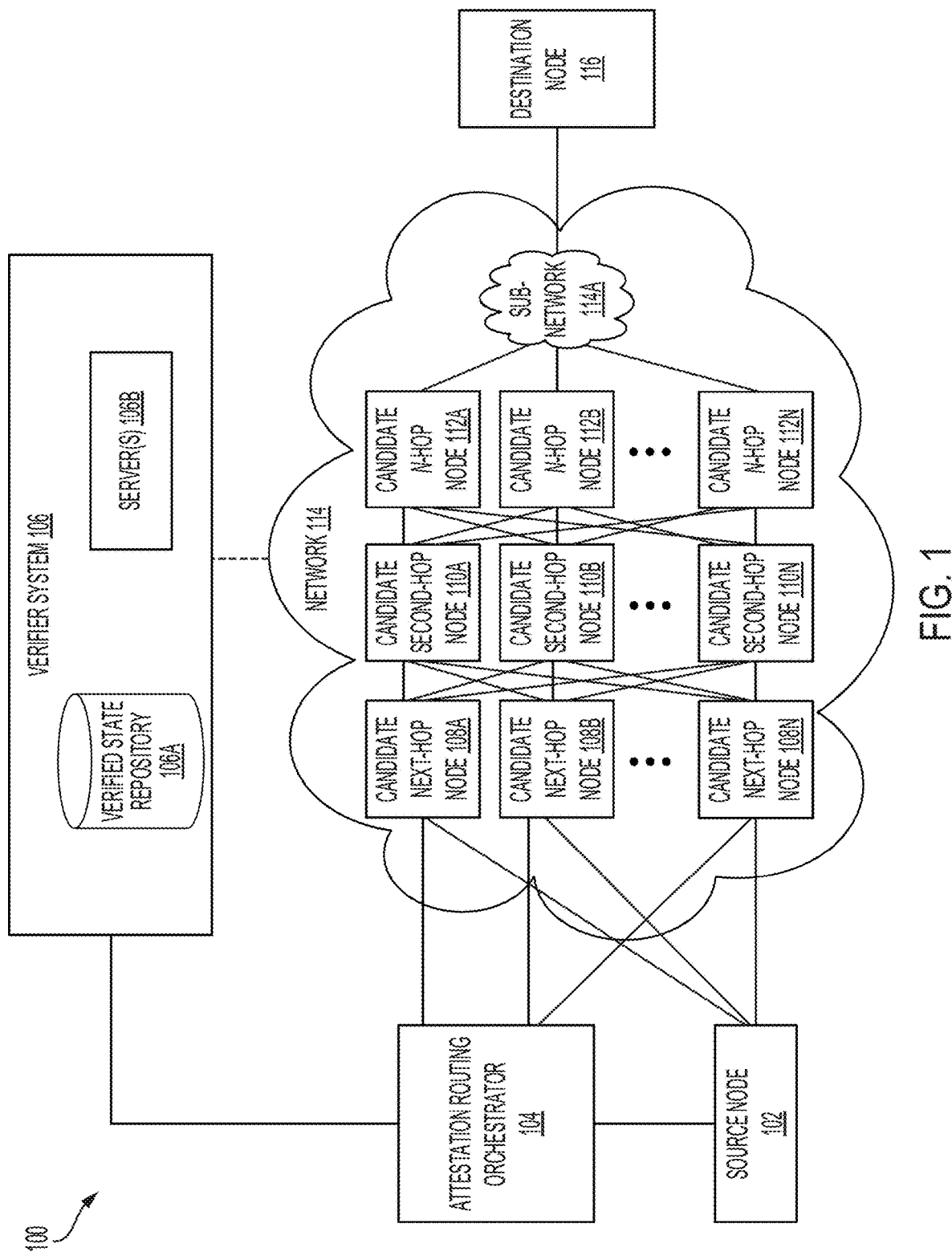
FIG. 1 is a block diagram of an example of a networking environment in accordance with some implementations.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

One or more examples described in the present application, provide methods, devices and computer-readable media for instantaneous measurement of trustworthiness of network devices based on measurable (visible) and non-measurable/not measured (invisible) indicators of possible compromises and attacks on such network devices.

In one aspect of the present disclosure, a method for trustworthiness evaluation of network devices includes determining, by a first network device, a first probability of a security compromise of a second network device based on visible indicators; determining, by the first network device, a second probability of the security compromise of the second network device based on invisible indicators; determining, by the first network device, a trust degradation score for the second network device; and establishing, based on the trust degradation score, a specified type of communication session with the second network device.

In one aspect of the present disclosure, a system includes one or more processors; and at least one computer-readable storage medium having stored therein instructions which, when executed by the one or more processors, cause the one or more processors to determine, by a first network device, a first probability of a security compromise of a second network device based on visible indicators; determine, by the first network device, a second probability of the security compromise of the second network device based on invisible indicators; determine, by the first network device, a trust degradation score for the second network device; and establish, based on the trust degradation score, a specified type of communication session with the second network device.

In one aspect of the present disclosure, a non-transitory computer-readable storage medium includes instructions stored therein which, when executed by at least one processor, cause the at least one processor to: determine, by a first network device, a first probability of a security compromise of a second network device based on visible indicators; determine, by the first network device, a second probability of the security compromise of the second network device based on invisible indicators; determine, by the first network device, a trust degradation score for the second network device; and establish, based on the trust degradation score, a specified type of communication session with the second network device.

The foregoing, together with other features and embodiments, will become more apparent upon referring to the following specification, claims, and accompanying drawings.

DETAILED DESCRIPTION

The disclosed technology addresses the need in the art for controller based trustworthiness evaluation for network devices (e.g. network nodes, routers, client devices, sensors, controllers, etc.). More specifically, the present disclosure describes systems and methods for instantaneous measurement of trustworthiness of network devices based on measurable (visible) and non-measurable/not measured (invisible) indicators of possible compromises and attacks on such network devices.

The disclosure now turns to an initial discussion of example concepts and technologies for providing verifiable proof of integrity of network nodes traversed by packets.

A computer network can include different nodes (e.g., network devices, client devices, sensors, and any other computing devices) interconnected by communication links and segments for sending data between end nodes. Many types of networks are available, including, for example, local area networks (LANs), wide area networks (WANs), software-defined networks (SDNs), wireless networks, core networks, cloud networks, the Internet, etc. When data traffic is transmitted through one or more networks, the data traffic typically traverses a number of nodes that route the traffic from a source node to a destination node.

While having numerous nodes can increase network connectivity and performance, it also increases security risks as each node that a packet traverses introduces a risk of unauthorized data access and manipulation. For example, when a packet traverses a node, there is a security risk that is introduced which can result from the node being potentially compromised (e.g., hacked, manipulated, captured, etc.). As a result, compliance, security, and audit procedures can be implemented to verify that network users, devices, entities and their associated network traffic comply with specific business and/or security policies.

When sensitive information is transmitted through nodes in a network, such as in battlefield, banking settings, and healthcare settings, such traffic should be sent through uncompromised nodes to prevent access to, leakage of, or tampering with the data and sensitive information carried by that traffic. If an attacker gains access to a device via some exploit, previous protection and encryption approaches for network interfaces are generally ineffective at mitigating or addressing such unauthorized access and resulting damage.

Proving that network traffic complies with specific policies can involve proving in a secure way that the traffic has traversed a well-defined set of network nodes (e.g., firewalls, switches, routers, etc.) and that such network nodes have not been modified or compromised. This can help ensure that the network nodes have performed their expected or intended actions (e.g., packet processing, security or policy compliance verification, routing, etc.) on the packet and that the packet has traversed the network nodes.

Some security approaches can aim at removing any implied trust in the network used for connecting applications hosted on devices to cloud or enterprise hosted services. Moreover, some security approaches can be implemented to verify the trustworthiness (e.g., the integrity, identity, state, etc.) of the network and/or nodes traversed by packets. In some cases, certain verification checks can be implemented to validate or verify that traffic has traversed a specific set of nodes and that such nodes are trusted and uncompromised. In some examples, certain Proof-of-Transit (POT), Trusted Platform Module (TPM), attestation, or proof of integrity approaches can be implemented to verify or validate the trustworthiness of a node in a network.

POT can enable a network user or entity to verify whether traffic traversed a defined set of network nodes. Attestation, as further described below, can also be used to verify the integrity of a node. In some cases, the approaches herein can integrate both to offer a secure approach that allows network users or entities to verify that traffic has traversed a defined set of nodes and that such nodes have not been compromised.

In some cases, TPM can be implemented to collect and report the identity of hardware and software components in a platform to establish trust for that platform. A TPM used in a computing system can report on the hardware and software of the system in a manner that allows verification of expected behavior associated with that system and, from such expected behavior, establishment of trust. The TPM can be a system component containing state that is separate from the host system on which the TPM reports identity and/or other information. TPMs can be implemented on physical resources (indirectly or directly) of the host system. In some examples, a TPM component can have a processor and memory such as RAM, ROM and/or flash memory. In other implementations of a TPM, a host processor can run TPM code while the processor is in a particular execution mode. Parts of system memory can be partitioned by hardware to ensure that memory used by the TPM is not accessible by the host processor unless the host processor is in the particular execution mode.

In some cases, trusted computing (TC) implementations, such as TPM, can rely on Roots of Trust. Roots of Trust can be system elements that should be trustworthy because misbehavior by such system elements may not be detectable. A set of roots can provide a minimum functionality that can sufficiently describe characteristics that affect a platform's trustworthiness. In some cases, determining if a Root of Trust is behaving properly may not be possible; however, it may be possible to determine how roots are implemented. For example, certificates can provide assurances that the root has been implemented in a way that renders it trustworthy.

To illustrate, a certificate may identify the manufacturer and evaluated assurance level (EAL) of a TPM. Such certification can provide a level of confidence in the Roots of Trust used in the TPM. Moreover, a certificate from a platform manufacturer may provide assurance that the TPM was properly installed on a system that is compliant with specific requirements so the Root of Trust provided by the platform may be trusted. Some implementations can rely on three Roots of Trust in a trusted platform, including Root of Trust for Measurement (RTM), Root of Trust for Storage (RTS), and Root of Trust for Reporting (RTR).

The RTM can send integrity information, such as integrity measurements, to the RTS. Generally, the RTM can be a processor controlled by a Core Root of Trust for Measurement (CRTM). The CRTM is the first set of instructions executed when a new chain of trust is established. When a system is reset, the processor (e.g., RTM) can execute the CRTM, which can then send values that indicate its identity to the RTS. Thus, in some cases, the starting point for a chain of trust can be established in this manner.

As previously noted, the TPM memory can be shielded from access by an entity other than the TPM. Since the TPM can be trusted to prevent unauthorized access to its memory, the TPM can act as an RTS. Moreover, the RTR can report on the contents of the RTS. An RTR report can be a digitally signed digest of the contents of one or more values in a TPM.

Attestation is another example trusted computing approach that can be used to verify the integrity of a node. Attestation can be applied to a node, such as a router or switch, to review logs from connected devices, such as Layer 1 (L1) or Layer (L2) connected devices and maintain these logs in trusted storage. These logs can be protected by embedding a private key into every trust anchor produced for a hardware device and publishing the device's public key as a certificate to adjacent devices. This peering device can then push log updates from trusted storage periodically and/or on some log entry event. Reviewing any provided signed logs can provide an understanding of the current trustable state of a peer device. Moreover, by looking back at the set of transactions which have occurred since boot time, a determination can be made regarding the trustworthiness of the information which that peer device is asserting.

In some examples, metadata elements containing security measurements or evidence, can be used to provide verifiable evidence of device trustworthiness (e.g., integrity, state, etc.). The metadata elements can include applicable data for verifying trustworthiness of a device and be provided through an applicable technique for verifying device trustworthiness. For example, the metadata elements can be provided as part of a canary stamp associated with the device. A canary stamp can indicate or otherwise include a signed measurement associated with a device for verifying trustworthiness of the device. In turn, such measurements can be referred to as canary stamps because each signed measurement is like a stamp proving its authenticity, and like a canary in a coal mine that indicates an early sign of trouble. Such verifiable evidence can be appended or included in packets transmitted by nodes on a network. The metadata elements can thus be used to evaluate the trustworthiness of a node(s) and react accordingly. For example, a device or entity can review metadata element associated with a node to determine that the node should not be trusted and adjust a network policy to mitigate possible damage.

In some implementations, dedicated cryptoprocessors, such as a processor in TPM platform, can take measurements to attest to the trustworthiness (e.g., identity, integrity, etc.) of a node and its environment (e.g., software, hardware, operating system, running binaries, firmware, etc.). These measurements include evidence that the node is in a safe state. In some cases, these measurements can be provided through canary stamps, as previously described. However, a receiver of such evidence should be able to certify that the evidence is fresh, as the evidence can become stale thereby potentially reducing its effectiveness in reflecting the current trustworthiness of a node. For example, without ensuring freshness of such evidence, an attacker has an opening to inject previously recorded measurements and asserting what is replayed as being current.

Some approaches can detect the replaying of old evidence via a "nonce". A nonce is an arbitrary number that can be used to introduce randomness. In some instances, a nonce can be used just once in a cryptographic communication. Further, a nonce can be passed into a TPM and/or incorporated into a canary stamp/metadata. In some cases, a result provided by the TPM can include a signature based on the nonce. Since the nonce can be grounded in a transactional challenge/response interaction model, in some cases the nonce may be less effective with unidirectional communications originating from an attesting device. For example, a nonce may less effective with an asynchronous push, multicast, or broadcast message.

However, there are numerous use cases where a platform assessing whether its peers are trustworthy is advantageous. Being able to perform a unidirectional attestation using an asynchronous push, multicast, or broadcast message in conjunction with trusted binaries opens many possibilities for platforms to assess whether their peers are trustworthy. Detection of invalid attestations can trigger alarms or events, reduction of network access from a suspect device, or can become a part of Admission Control (e.g., IEEE 802.1X). Some platforms can be configured to support the unidirectional attestation mechanism.

Other freshness approaches can be based on trusted computing capabilities, such as TPM. For example, a token can be generated which allows external entities to validate freshness of asserted data based on the state of internal counters within the TPM. This token can be used to detect replay attacks, and provide attestation for asynchronous push, multicast, and broadcast messages.

Various of the foregoing approaches can be combined with TPM-integrated capabilities aimed at verifying that valid compute components, such as binary processes, are running on a node. These capabilities can include, for example, Trusted Execution Environments (TEE) which provide runtime malware protections, Authenticated Code Modules (ACM) which ensure that only digitally-signed code modules can be loaded into a processor, and the like. These technologies can validate that a processor is running known software with a valid chain of binary signatures.

In some cases, metadata elements, e.g. canary stamps, and tokens can be created by extracting current counters (e.g., clock, reset, restart) from a node's TPM, and incorporating such counters and security measures taken from the node into a packet. In some examples, the current counters and/or security measures can be hashed with information within an external TPM. The metadata elements and tokens can thereby provide a non-spoofable token or metadata element, which can bind continuously incrementing counters on an attestee with a known external state. Any resetting of the TPM counters is visible in any subsequent TPM queries, and any restarting of a platform is also exposed in subsequent TPM queries. Within these bounds of reset and restart, the TPM's time ticks counter continuously increments. Therefore, any push of attestee TPM information which includes these counters can be determined to have occurred subsequent to any previously-received measurement. Also, if the reset and restart counters have not changed, the incremental time since any previous measurement can also be known.

In some cases, a large amount of information that should be trusted by network peers may not be contained within the TPM's Program Configuration Registers (PCR). As a result, indirect methods of validating that a node has not been compromised can be applied.

The receipt of the metadata elements, e.g. canary stamps, and/or tokens can mean that a receiver should have the option of verifying the information. In many cases, such verification can be performed without the need of supplementary evidence being sent with the canary stamp. Moreover, in non-controller based or centralized implementations, the verification steps do not have to occur at the receiver.

In some integrity verification implementations, a controller or device can implement an integrity verification application. The integrity verification application can be designed to recognize change events and evaluate known good values, which allow evaluation of a boot-integrity stamp and a running process binary signature stamp based on, for example, TPM counters, timestamps, nonces, and/or time tokens. On any discrepancy, a controller or centralized device can isolate a compromised node from its network peers by shutting down the interfaces of the node.

In some examples, the metadata elements, e.g. canary stamps, and/or verifications for integrity can be implemented, such as a measured-boot stamp (e.g., SHA1 hash over PCRs 0-7), a verified-boot stamp (e.g., which can verify that only recognized binaries were executed when booting), a process-stamp (e.g., root-of-trust validated through a process which is asserting a particular protocol or protocols), a file-system stamp (e.g., all files within a vendor determined set of directories), a log-integrity stamp (e.g., used to augment existing integrity analytics and forensics), a configuration stamp (e.g., State of the current device configuration), etc. Some implementations can achieve all or some of these stamps, depending on the implementation. Moreover, in some implementations, all or some of these stamps can be implemented or achieved using a single or multiple stamps.

As previously explained, TPM provides methods for collecting and reporting the identity of hardware and software components in a platform to establish trust for that platform. TPM functionality can be embedded in a variety of devices including mobile phones, personal computers, network nodes (e.g., switches, routers, firewalls, servers, network appliances, etc.), and/or any other computing devices. Further, attestation can describe how the TPM can be used as a hardware root of trust and offer proof of integrity of a node. Such integrity can include hardware integrity, software integrity (e.g., micro loader, firmware, boot loader, kernel, operating system, binaries, files, etc.), and runtime integrity.

In some cases, TPM and attestation can be implemented as described herein to provide proof of integrity and proof of transit through uncompromised nodes. In some examples, metadata elements and tokens containing or reflecting security measures are used as previously mentioned to validate the integrity of a node and perform continuous evaluation of node integrity. Thus, the metadata elements and tokens described herein can be used to provide proof of transit through uncompromised nodes.

In some examples, the metadata elements and tokens can be added as additional metadata to packets that traverse a network where proof of transit via uncompromised nodes is desired. Various strategies can be implemented for transporting the metadata elements and tokens in a packet. In some cases, the metadata elements and tokens can be carried within an In-Situ (or in-band) Operations, Administration and Management (IOAM) data field.

In some implementations, the metadata elements and tokens can be carried with IOAM trace data. For example, a canary stamp can be carried as part of an IOAM data field in a variety of encapsulation protocols such as, for example and without limitation, IPv4, IPv6, NSH (Network Service Header), etc. In some cases, the canary stamp can be carried in an IOAM data field as an IOAM Trace option data element (e.g., with an IOAM Trace type for node integrity canary stamp). A metadata element, token, or digest, e.g. canary stamp digest, can be added in the IOAM trace option of a packet by each node that forwards the packet.

When the packet reaches a node (e.g., the destination node and/or an intermediate node) that removes IOAM metadata (e.g., an IOAM decapsulating node), the validity of the metadata element and/or token in the packet can be verified to determine that the packet traversed uncompromised nodes. In some examples, since canary stamps are time bound, the packet trace timestamps defined in IOAM can be used to validate the canary stamp in the time window the packet traversed that node.

Verification can be performed without placing a large transactional load on the verifier or a device, such as a controller, that will ultimately validate the security measurements associated with the metadata elements or tokens. This is because the measurement values can often change infrequently. The verifier may only need to validate a metadata element and/or token carried within an IOAM data trace whenever the associated security measurements associated change (e.g., a verifier may only need to check with a controller whenever it sees a node's TPM extends a PCR value which was not previously confirmed by the verifier).

In some cases, when only the time ticks within a signed metadata element increases, only the signature of the metadata element is validated. To do this, the verifier may use the public key of any node which can place a metadata element. Such signature validation can be done without using a controller to verify the measurements.

In another example, a packet can carry IOAM POT data with space optimization of metadata element values, e.g. canary stamp values. For example, a new IOAM POT data field can carry a canary stamp or a hash extend of a canary stamp and, in turn, canary stamp data can be carried across nodes. In some cases, a canary stamp hash extend can be a similar method as PCR extend operation performed by TPMs.

In some cases, the canary stamp hash can provide a one-way hash so that a canary stamp recorded by any node cannot be removed or modified without detection. IOAM proof of transit option data for a canary stamp digest can be defined by a hash algorithm (e.g., 20 octets with SHA1, 32 octets with SHA 256, etc.). In some implementations, each node along a path of the packet can forward the packet with a new or updated canary stamp digest. In some examples, the new or updated canary stamp digest can be generated by a node as follows: IOAM canary stamp digest new value=Digest of (IOAM canary stamp digest old value|| hash(canary stamp of the node)), where the IOAM canary stamp digest old value can refer to the canary stamp digest included in the packet by one or more previous hops.

Moreover, in some cases, a Per Packet Nonce (PPN), where PPN changes per packet and is carried as another field within the IOAM metadata option, can be added to provide robustness against replay attacks. To illustrate, in some examples, a PPN can be added as follows: IOAM canary stamp digest new value=Digest of (IOAM canary stamp digest old value|| hash(canary stamp of the node||PPN)). A node creating the new value for the IOAM canary stamp digest can thus take the value of any previous IOAM canary stamp digest and extend/hash that value with the node's current canary stamp. The result of the concatenation and hashing can then be written into IOAM POT data (or other IOAM data fields) as the new IOAM canary stamp digest.

At the verifier (e.g., the device verifying the canary stamp data), the same operation can be performed over expected canary stamp values calculated for the nodes that are traversed in the time window when the packet was forwarded. A verifier can be an inline device or a centralized device. Moreover, in some examples, nodes that are expected to be traversed can be identified using IOAM tracing, routing state or by sending active probes. A match between the value of POT data carrying specific metadata elements, e.g. a canary stamp digest and the expected canary stamp value, can prove that the packet traversed through trusted or uncompromised nodes.

In some examples, one or more strategies can be implemented to optimize metadata element validation. For example, metadata elements, e.g. canary stamps, can detect attempts of a replay attack by embedding a nonce as well as TPM or TPM2 counters (e.g., clock, reset, restart). In some cases, this nonce can be part of the metadata elements and different from the PPN described above.

The nonce is relevant to a receiver as the interval from the nonce's creation time to the first stamp received by the verifier can define the interval of freshness (e.g., the measurement is no older than this interval of freshness). From there, the TPM2 time ticks counter can be used to maintain that initial gap of freshness even without the delivery of a new nonce.

In some implementations, to optimize metadata element or token validation across nodes, the following approaches can be implemented to deliver synchronization information from a central component to each node and the verifier. For example, a central server can broadcast or multicast centralized nonce values (e.g., tracked random numbers). Each node can pick up the latest nonce and use it to attest a value. A verifier can know the freshness of a metadata element or token it receives from each node. This freshness can be the delta in time since that particular nonce was issued. Subsequent attestations can use the incrementing time ticks to prove freshness from that initial time gap. In some cases, the issuing of new nonces can reset the time gap to a potentially shorter interval.

Moreover, in some cases, each node can embed attested time within its metadata element. To get attested time, a TUDA (Time-Based Uni-Directional Attestation) scheme such as the TUDA scheme described in https://tools.ietf.org/id/draft-birkholz-i2nsf-tuda-01.html, the contents of which are incorporated herein by reference in their entirety, can be used. This can result in the availability of both the attested time at a node, as well as the value of the TPM2 counters at this node when a TUDA time-synchronization token was created. This can eliminate the use of a central nonce authority, but can increase the size of the metadata element as the nonce can be replaced by the TUDA time-synchronization token. This approach may also implement a central timestamp authority as per TUDA. In some examples, for each hop, a canary stamp digest value can be: IOAM canary stamp digest new value=Digest of (IOAM canary stamp digest old value|| hash(canary stamp of the node|| TUDA time-synchronization token of the node)).

This approach can provide numerous benefits. For example and without limitation, with this approach, a verifier can limit the number of verifications by verifying the signature of a hop's time-synchronization token only when it changes. Moreover, with this approach, there may not be a time gap nonce changeover freshness when a first measurement is received. Further, in some cases, this approach can be implemented without also carrying a PPN or without synchronizing a nonce across nodes as previously described.

Further, an attestor, e.g. a node or a verifier, can use random numbers, otherwise pseudo-random numbers, created by peers and/or the attestor to generate and verify attestation information. Specifically, the attestor can accumulate random numbers from one or more layer 2 peers. The random numbers can be accumulated from the peers over a specific amount of time, e.g. a short duration of time. In turn, the random numbers can be combined into a number through an applicable technique, e.g. a Bloom filter. This number can serve as a nonce for a cryptoprocessor for generating a result. As follows, the layer 2 peers, potentially including the attestor, can use the result created by the cryptoprocessor, to verify/validate that their corresponding provided random number was used in generating the nonce ultimately used by the cryptoprocessor to create the result. In turn, the layer 2 peers, potentially including the attestor, can generate verified attestation information based on the random numbers generated by the peers, the nonce created from the random numbers, and/or the result created by the cryptoprocessor from the nonce.

Certain previous systems rely on the freshness (e.g., the recency) of measurements of a node in order to verify the security (e.g., trustworthiness) of the node. This is problematic because the reliability and accuracy of the verification is proportional to the frequency with which measurements are taken. Accordingly, a high utilization of network resources corresponds to a high reliability system, and vice versa. Another problem with a freshness-based system is that an attacker can inject previously recorded measurements into the node being verified (e.g., after gaining root access) in order to give the false appearance that the node has not been compromised. By contrast, various implementations disclosed herein verify the security (e.g., trustworthiness) of a node by comparing trusted information against corresponding information obtained from the node. In this way, verification proceeds irrespective of the freshness of information at the node. Moreover, utilization of the trusted information guards against the event where an attacker has changed information at the node.

Certain other previous systems provide a transactional process between the node making the verification request and the measurement device. For example, the requesting node provides a random number (e.g., a nonce) to the measurement device, which provides a signature across the response, including the returned random number itself. This indicates that the information is not being replayed from a time before the random number was available to the measurement device. Such a dependency of the requesting node for each signed response is problematic because the system is grounded in a transactional challenge and/or response interaction model. In other words, this system does not support unidirectional verification communications originating from the requesting node, such as an asynchronous push, multicast, broadcast message, and/or the like. By contrast, the attestation based routing disclosed herein supports these types of communications.

FIG. 1 is a block diagram of an example of a networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the first example of the networking environment 100 includes a network 110 that includes a sub-network 110*a*. In some implementations, the sub-network 110*a* corresponds to a local area network (LAN) or virtual local area network (VLAN). In some implementations, the sub-network 110*a* corresponds to a wide area network (WAN), such as the Internet. In some implementations, the sub-network 110*a* includes a combination of nodes included within a LAN, VLAN, and/or WAN.

The networking environment 100 can include a source node 102. The source node 102 can be a networking device (e.g., switch, router, gateway, endpoint, etc.) associated with a data packet that is destined for a destination node 116. The source node 102 can communicate with candidate next-hop nodes 108A-108N on the network 114. Each of the candidate next-hop nodes 108A-108N can be included within a respective route between the source node 102 and the destination node 116. Moreover, in some cases, each of the candidate next-hop nodes 108A-108N can communicate with candidate second hop nodes 110A-110N in the network 114. Each of the candidate second hop nodes 110A-110N can similarly communicate with candidate N-hop nodes 112A-112N in the network 114.

The networking environment 100 can also include an attestation routing orchestrator 104. The attestation routing orchestrator 104 can communicate with the candidate next-hop nodes 108A-108N. In some implementations, the attestation routing orchestrator 104 can obtain attestation data (e.g., canary stamps, security measures, signatures, and/or metadata) or vectors from the candidate next-hop nodes 108A-108N. In some examples, the attestation routing orchestrator 104 can obtain additional information from candidate second-hop nodes 110A-110N and/or candidate N-hop nodes 112A-112N and utilize the additional information in selecting a particular candidate next-hop node for a packet. In some implementations, the attestation routing orchestrator 104 can also obtain additional information from nodes that are more than two hops away (e.g., candidate third hop nodes, candidate fourth hop nodes, etc.).

The attestation routing orchestrator 104 can communicate with a verifier system 106. While, the verifier system 106 is conceptually shown as being implemented separate from the network 114, the verifier system 106 can be implemented within the network 114, e.g. as part of a network device in the network 114. In some implementations, the attestation routing orchestrator 104 can obtain trusted state, such as a trusted image vector, from the verifier system 106. The verifier system 106 can include a verified state repository 106A and one or more servers 106B. In some examples, the verified state in the verified state repository 106A can include one or more verified images, verified security measurements, verified settings, verified node data, and/or any other verified trust or integrity data. In some implementations, the verified state in the verified state repository 106A can include one or more trusted states or image vectors that are known with a degree of confidence to represent uncompromised states or images (e.g., states or images that have not been hacked, attacked, improperly accessed, etc.).

As will be described in great detail with reference to FIG. 4, in some cases, the attestation routing orchestrator 104 can select and direct a data packet to a particular candidate next-hop node of the candidate next-hop nodes 108A-108N based on a trusted state or image vector and the attestation states or vectors. Moreover, the attestation routing orchestrator 104 can direct the data packet destined for the destination node 116 to the particular candidate next-hop node.

Figure 2:
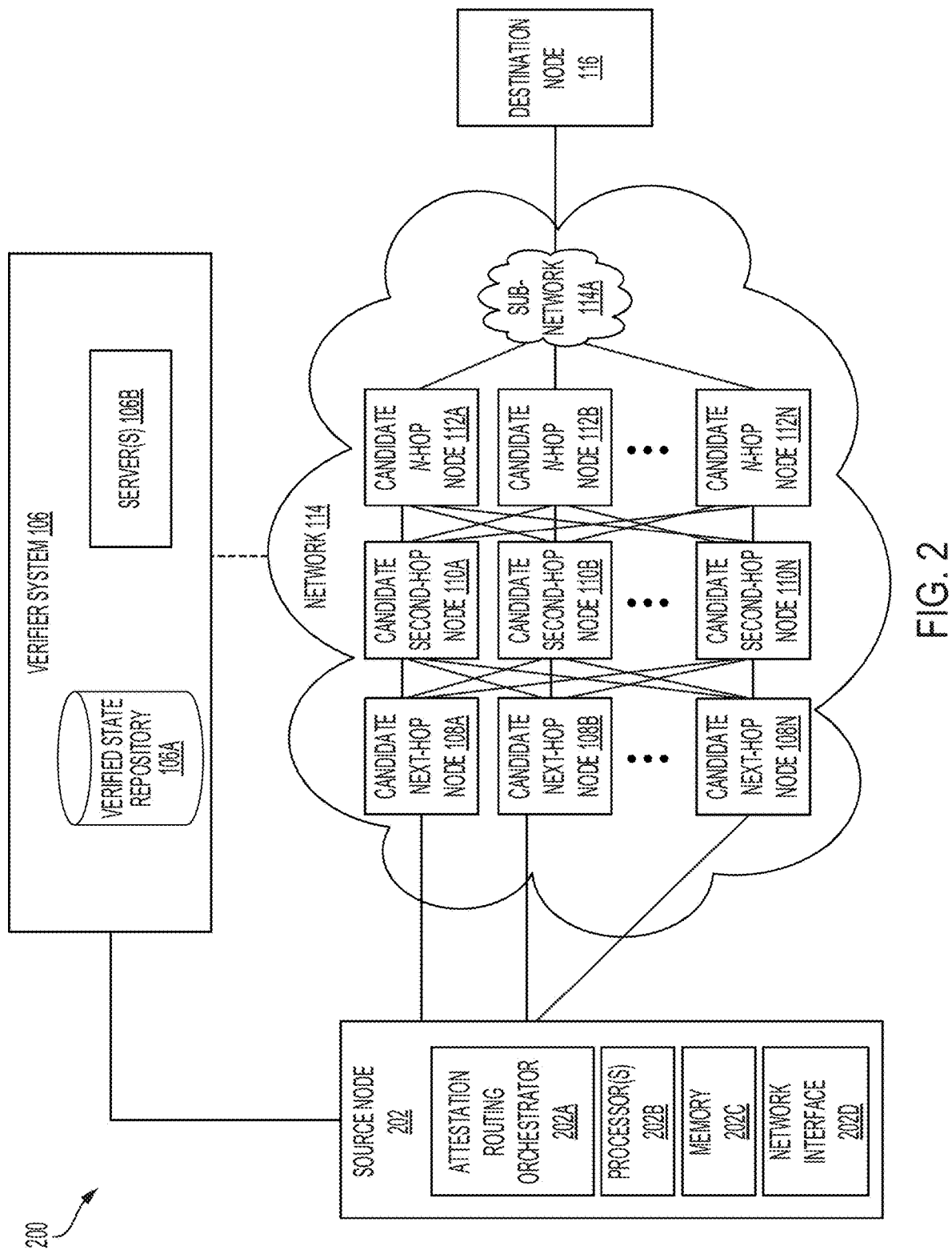
FIG. 2 is a block diagram of an example of a networking environment in accordance with some implementations.

FIG. 2 is a block diagram of another example networking environment 200 in accordance with some implementations. In this example, the networking environment 200 includes a source node 202 that implements an attestation routing orchestrator 202A. In some implementations, the attestation routing orchestrator 202A can be similar to, or adapted from, the attestation routing orchestrator 104 in FIG. 1.

The source node 202 can include one or more processors 202B. In some implementations, the one or more processors 202B can provide processing resources for generating a confidence scores for the candidate next-hop nodes 108A-108N. In some implementations, the one or more processors 202B can provide processing resources for selecting a particular confidence score, from the confidence scores, that satisfies one or more selection criteria.

In some examples, the source node 202 can include a memory 202C. The memory 202C can be, for example and without limitation, a non-transitory memory, such as RAM (random-access memory), ROM (Read-only memory), etc. The memory 202C can store the data, such as the packet destined for the destination node 116. In some implementations, the memory 202C can store a trusted state or image vector obtained from the verifier system 106. In some implementations, the memory 202C can store attestation states or vectors obtained from the candidate next-hop nodes 108A-108N and optionally attestation states or vectors obtained from the candidate second hop nodes 110A-110N and/or the candidate N-hop nodes 112A-112N. The source node 202 can also include a network interface 202D for obtaining, receiving, and transmitting the data packets and states or vectors.

In some implementations, the source node 202 can select and direct a data packet to a particular candidate next-hop node based a trusted state or image vector and the attestation states or vectors.

Figure 3:
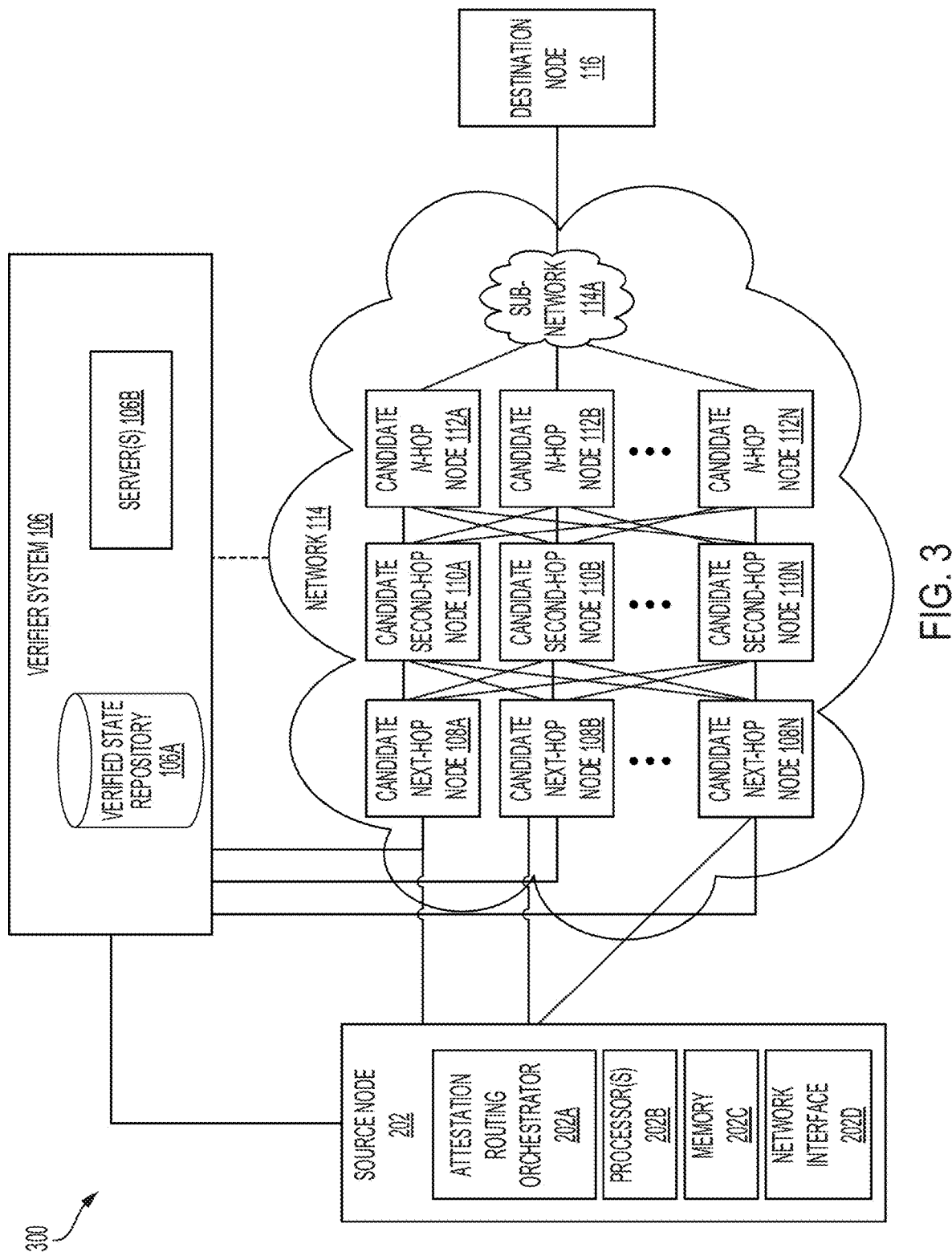
FIG. 3 is a block diagram of an example of a networking environment in accordance with some implementations.

FIG. 3 is a block diagram of another example networking environment 300 in accordance with some implementations. In this example, one or more of the candidate next-hop nodes 108A-108N can relay a trusted state or image vector from the verifier system 106 to the source node 302. In some implementations, the attestation routing orchestrator 302A can be similar to, or adapted from, the attestation routing orchestrator 104 in FIG. 1 and/or the attestation routing orchestrator 202A in FIG. 2.

In some implementations, the verifier system 106 can sign the trusted state or image vector and provide the signed trusted state or image vector to a particular candidate next hop node, which in turn can provide the signed trusted state or image vector to the source node 302. In some implementations, having the particular candidate next hop node provide the signed trusted state or image vector can reduce attestation time (e.g., the time to determine trustworthiness of the particular candidate next hop node) because the source node 302 may not need to contact a remote node (verifier system 106). In some implementations, attestation time can be further reduced because a single attestation process (e.g., the verifier system 106 signing the trusted state or image vector) facilitates the attesting of multiple source nodes. In other words, trusted states or image vectors may not be generated and evaluated on a per source node basis.

Moreover, in implementations in which the source node 302 is not connected to the verifier system 106 (e.g., link down), obtaining the trusted state or image vector from the particular candidate next hop provides an alternative mechanism for node attestation. In some implementations, the verifier system 106 appends a time-stamped response to the trusted state or image vector as part of the signing process, which can be referred to as stapling. Consequently, the source node 302 may not contact the verifier system 106 in order to attest a particular candidate next hop node.

Figure 4:
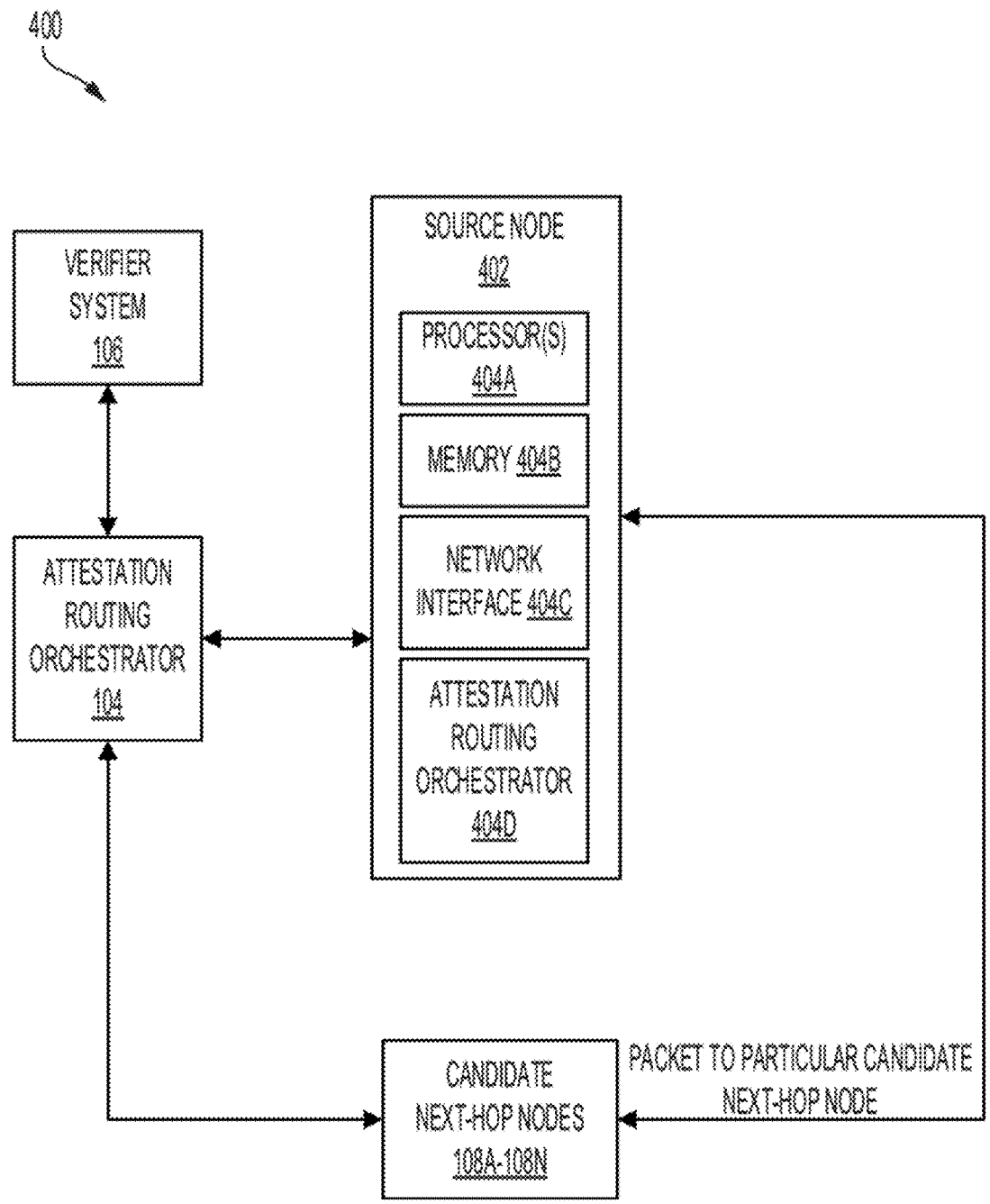
FIG. 4 is a block diagram of controller orchestrated attestation based routing in accordance with some implementations.

FIG. 4 is a block diagram of an example controller-orchestrated attestation-based routing 400 in accordance with some implementations. In some examples, the source node 402 is similar to, or adapted from, the source node 102 in FIG. 1. As illustrated in FIG. 4, the attestation routing orchestrator 104 is separate from, but coupled (e.g., connected) to, the source node 402. In some examples, the attestation routing orchestrator 104 can include a controller with knowledge of the network 114 that includes the candidate next-hop nodes 108A-N and optionally the candidate second-hop nodes 110A-N and/or the candidate N-hop nodes 112A-N.

For example, in some implementations, the attestation routing orchestrator 104 can be a network management system (NMS). As another example, in some implementations, the attestation routing orchestrator 104 can be an intent-based networking system, such as Cisco's Digital Network Architecture (DNA). As yet another example, in some implementations, the attestation routing orchestrator 104 can be a wireless LAN controller (WLC), and the candidate next-hop nodes 108A-108N and optionally the candidate second hop nodes 110A-N and/or the candidate N-hop nodes 112A-N can be networking devices such as access points, user devices, switches, routers, firewalls, etc.

The attestation routing orchestrator 104 can obtain attestation data (e.g., canary stamps) from the candidate next-hop nodes 108A-108N. Each of the candidate next-hop nodes 108A-108N can be included within a respective route between the source node 402 and a destination node (e.g., 114). In some implementations, the respective routes are independent of each other.

The attestation routing orchestrator 104 can determine confidence scores based on the attestation data. For example, in some cases, each of the confidence scores can be based on a comparison between a corresponding one of the attestation data and a trusted state or image vector. In some implementations, the attestation routing orchestrator 104 can obtain the trusted state or image vector from the verifier system 106.

In some examples, the attestation routing orchestrator 104 can obtain attestation data from candidate second-hop nodes (e.g., 110A-N) and/or candidate N-hop nodes (112A-N). Each of the candidate second-hop nodes and/or the candidate N-hop nodes can be included within a respective route between a corresponding one of the candidate next-hop nodes 108A-108N and the destination node. Moreover, each of the confidence scores can additionally be based on a comparison between a corresponding one of the attention data and the trusted state or image vector in combination with a comparison between another corresponding one of the attestation data from the candidate next-hop nodes 108A-N and the trusted state or image vector.

The attestation routing orchestrator 104 can select, from the confidence scores, a particular confidence score that satisfies one or more selection criteria. The particular confidence score is associated with a particular candidate next-hop node of the candidate next-hop nodes 108A-108N.

The attestation routing orchestrator 104 can directs, to the particular candidate next-hop node, a data packet destined for the destination node. For example, in some cases, the attestation routing orchestrator 104 can provide attested route information (e.g., validated canary stamp data, security measurements, etc.) to an attested route manager 402D of the source node 402 in order to facilitate the source node 402 sending the data packet to the particular candidate next-hop node. The attested route information can be indicative of the trustworthiness of each of the candidate next-hop nodes 108A-108N.

For example, in some implementations, the attested route information includes an identifier (e.g., an IP address, a MAC address, an SSID, etc.) identifying a secure candidate next-hop node of the candidate next-hop nodes 108A-108N. In this example, the source node 402 can provide the data packet based on the identifier in order to route the data packet to the secure, particular candidate next-hop node.

As another example, in some implementations, the attested route information can include confidence scores associated with the candidate next-hop nodes 108A-108N. In this example, the attested route manager 402D can select a particular candidate score based on one or more selection criteria. Moreover, the attested route manager 402D can provide the data packet to the particular next-hop node associated with the particular candidate score. In some examples, the attestation routing orchestrator 104 can cease to direct additional data packets to the particular candidate next-hop node in response to determining that the particular confidence score falls below a confidence threshold.

In some cases, the source node 402 can include one or more processors 402A. The one or more processors 402A can provide processing resources for managing attested route information obtained from the attestation routing orchestrator 104. The source node 402 can also include a memory 402B. The memory 402B can include, for example, a non-transitory memory such as RAM, ROM, etc. In some examples, the memory 402B can store data such as the obtained attested route information and data packets to be transmitted. The source node 402 can also include a network interface 402C for obtaining the attested route information and sending/receiving other data.

Determination of whether a network device has been compromised or not is a function of available/visible indicators associated with the network device and time. The visible indicators include, but are not limited to, a set of currently available evidence footprints which indicate a compromise may be in place on a particular remote device. Such indicators can come from multiple sources, including from industry cryptoprocessors such as a TPM2, Entity Attestation Tokens (EAT), Syslog, Cisco's Embedded Event Manager (EEM), peer devices, traffic counters, and other sources. Visibility can be a preferred method of identifying a compromise, as it is easier to react to the compromise in a timely manner. These indicators may be referred to as visible indicators. These visible indicators may be any sort of checkable modification to the underlying physical network device and/or software/VMs, etc. running thereon that can be checked and validated.

When there are no visible indicators (i.e., no visible footprints available), the probability of a remote device compromise is a function of the time which has passed since the last validation that the device is in a known good state. Time can be a less preferable method compared to visibility method described above, as there will be a lag before any remediation might be applied. These indicator(s) may be referred to as invisible and/or time indicators. These invisible indicators may be any sort of modification to the underlying physical network device and/or software/VMs, etc. running thereon that either cannot be checked or requires significant intrusive device and memory checks. Such invisible indicators may, at a future point in time, become visible as appropriate codes and syntaxes for discovering them are developed. Therefore, such invisible indicators may also be referred to as currently invisible indicators.

FIG. 5 illustrates an example table of visible and non-visible indicators defined above, according to an aspect of the present disclosure. As can be seen from table 500, each entry defines a particular type of attack or possible compromise of a network device that can be at an application level, Linux level or hardware level. In table 500, each entry is either marked with reference numeral 502 indicating an example of an invisible indicator, the determination of which may require device and memory checks, 504 indicating another example of an invisible indicator, the determination of which is not possible or 506 indicating an example of a visible indicator that can be measured/checked. Entries of table 500 are non-limiting examples of different types of visible/invisible indicators and are non-exclusive.

With the above two categories of visible/invisible indicators, an instantaneous formula can be provided for estimating probability or chance of a compromise on any given device operating within a network.

For visible factors/indicators: Pv1 can be defined as a probability for compromise of type 1 when there is a specific set of events/signatures existing which correspond to the compromise. Pv2 can be defined as a probability for compromise of type 2 and Pvx can be defined as a probability for compromise of type x. Assuming each of these compromises Pv1, Pv2, . . . , Pvx are independent, the following formula gives the probability of visible compromise based on recognized signatures (Pv):

$$Pv=1-((1-PV1)(1-Pv2)\ldots(1-Pvx)) \quad (1)$$

Other type of known or to be developed formulas may be used instead of or in conjunction with formula (1) when there are interdependencies between different types of evaluated compromises (Pv1, Pv2, . . . Pvx).

Furthermore, any given probability (e.g., Pv1 . . . Pvx) may be determined based on evidences of events from a particular device for which the probability of a compromise is being calculated (e.g., via formula (1)) and/or evidence obtained from one or more devices adjacent to the device for which the probability of a compromise is being calculated (e.g., via formula (1)).

For invisible/time factors/indicators, a probability that an invisible compromise has occurred to a remote device in the deployment environment can be expressed by the following formula:

$$Pi=1-((1-\text{chance of invisible compromise in time period } t)^{\text{number of } t \text{ intervals since last verification of a good/uncompromised remote system state}}) \quad (2)$$

Effectively knowing Pi implies that on operator knows the half-life which should be expected before a remote device should be considered compromised independently of any concrete evidence. It should be noted that a probability of an invisible compromise does not have to be static. Real time modification based on current knowledge of viruses/attacks may be allowed With formulates for visible and invisible factors as described above (formula (1) and formula (2)), an overall probability of a compromise for a given device may be given by $$Pc=1-((1-Pv)*(1-Pi)) \quad (3)$$

Formula (3) provides an indicator of trustworthiness (safety) of a given device. This metric considers both time based entropy and any available evidence which can be correlated to known compromises.

If Pc can be calculated (or even roughly estimated), various costly functions can be efficiently prioritized. For example, a controller may schedule when to do deeper validation (or perhaps direct refresh) of a remote device. This scheduling could include determining when to perform active checks to validate remote device memory locations (locations perhaps containing executable code which might have been compromised). These can be used to return the system to a known good state (and reset the entropy timer). Local configuration repositories can be refreshed based on evidence of security/trustworthiness issues underway, rather than being based just on time. Beyond the scheduling of system checks, there can be forwarding implications based on the value of Pc. For example, routing/switching behavior might be adjusted/impacted based on the relative trustworthiness of a remote device. Where a higher Pc values exist, sensitive data traffic flows can be routed around that device.

As a further advantage of the present disclosure, it should be noted that encryption alone may be insufficient to protect sensitive flows since there are scenarios where even the fact that a flow is occurring between endpoints might be considered information to be protected (e.g., in a battlefield).

Figure 6:
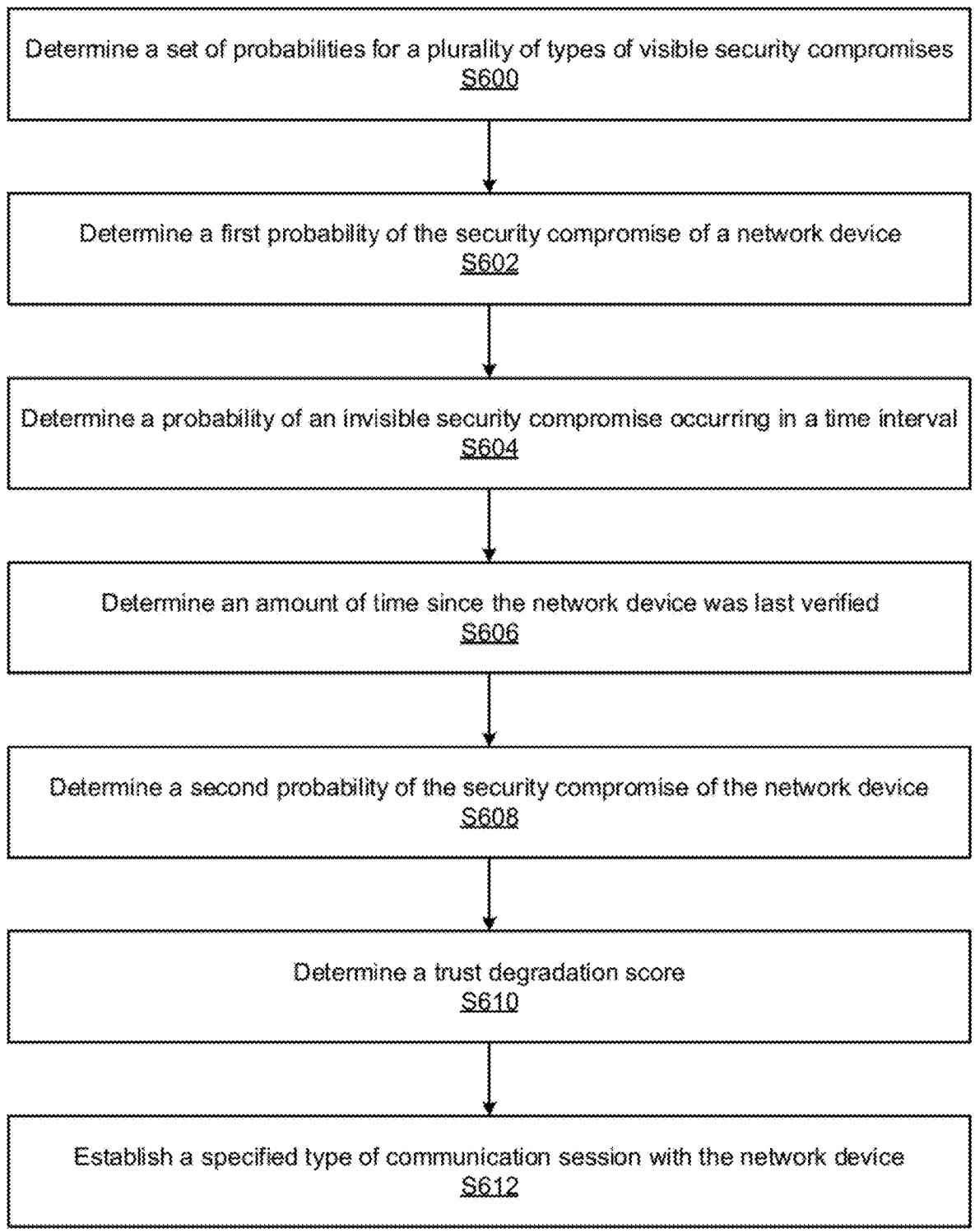
FIG. 6 is an example method of determining a device trustworthiness in accordance with some implementations.

FIG. 6 is an example method of determining a device trustworthiness in accordance with some implementations. The method may be implemented by a first network device to determine the device trustworthiness of a second network device. For clarity and discussion purposes, FIG. 6 will be described from a perspective of a network controller (the first network device), such as attestation routing orchestrator 101 of FIG. 4, determining the trustworthiness of router (the second network device), which can be source node 402 and/or any one or more of candidate next-hop nodes 108A-108N of FIG. 4. Furthermore, it is noted that such controller or other first network device may have one or more memories having computer-readable instructions stored therein, which when executed by one or more associated processors, configure the controller or other first network device to perform the steps of FIG. 5.

At S600, the network controller may determine, based upon corresponding visible indicators, a set of probabilities for a plurality of types of security compromises. In some instances, the security compromises may be visible security compromises, such that positive visible indicators suggest that there may be a visible security compromise. As noted above, visible indicators are comprised of a set of currently available evidence footprints which indicate a compromise may be in place on a network device. In some embodiments, the visible indicators may include one or more detected modifications to at least one of a hardware, an operating system, and one or more applications running on the second network device. For example, a visible indicator may be an integrity verification application checking a file signature of a runtime of an operating system upon load or execution, such that the visible indicator may be positive when the file signature shows a modification. Accordingly, the modified file signature may suggest that there is a visible security compromise on the operating system runtime. As another example, a visible indicator may be an integrity verification application checking an inventory of hardware, such that the visible indicator may be positive when a hash of the inventory shows that the hardware was swapped prior to booting or initializing. Thus, the hash indicates that there was a modification to the hardware and may suggest that there is a visible security compromise in the hardware. Similarly, in some embodiments, the visible indicators may come from multiples sources including, but not limited to, TPM2, Entity Attestation Tokens (EAT), Syslog, Cisco's Embedded Event Manager (EEM), peer devices, traffic counters, and other sources.

Thus, the set of probabilities for the plurality of types of visible security compromises may be based on the visible indicators that correspond to each type of visible security compromise after performing a set of measurements thereon. Additionally, in some embodiments, logs and data of detected compromises may be stored and subsequently utilized to train a machine learning algorithm that may determine trends, predictions, and the set of probabilities. Accordingly, the set of probabilities for the plurality of types of security compromises may be determined based on past or previously detected compromises after performing the set of measurements of the corresponding visible indicators.

At S602, the network controller may determine a first probability (Pv) of a security compromise for the router. The first probability Pv of a security compromise may be based on the visible indicators. Thus, such first probability Pv may be determined according to formula (1) as described above. In further detail, the first probability Pv may be determined based upon the set of probabilities of different types of security compromises. The first probability Pv may also weight the set of probabilities of different types of security compromises for a weighted set of probabilities for each of the different types of security compromises. The weighted set of probabilities may give higher weight to types of security compromises that are more likely to affect specific network devices. For example, some security compromises can only target routers; thus the weighted set of probabilities may weigh those security compromises higher when determining the first probability Pv of a security compromise for the router.

At S604, the network controller may determine a probability of an invisible security compromise occurring in or during a time interval. In other words, the network controller may determine how likely invisible security compromises occur to network devices within a specified or given range of time. In some embodiments, the network controller may have access to logs and historical data of maintenance and validations of whether the network devices are compromised. Thus, the logs and the historical data may train a machine learning algorithm to determine trends, predictions, and the probability of an invisible security compromise. In other words, the probability of an invisible security may further be based upon historical data of detected compromises.

At S608, the network controller may determine an amount of time since the router was last verified. As discussed above, the network controller may have access to logs and historical data of maintenance and validations to determine when the router was last verified to be in a known good state or not compromised.

At S610, the network controller may determine a second probability Pi of a security compromise for the router. Such second Pi probability may be determined according to formula (2) as described above. Like with the first probability Pv, the second probability Pi may be based upon multiple factors. More specifically, the second probability Pi may be based upon the probability of the invisible security compromise occurring within the time interval and the amount of time since the router was last verified. In other words, the probability Pi is higher when there has been a larger amount of time since the router was last verified because there is more time for an invisible compromise to occur. Like with the first probability Pv, the second probability Pi may be weighted to account for security compromises that are more likely to affect the type of network device it is. For example, as mentioned above, some security compromises can only target routers; thus the weight of the probability may be higher for routers than network switches.

At S610, the network controller may determine, based on the first probability and the second probability, a probability of trustworthiness Pc of the device (a trust degradation score). In some embodiments, the probability of trustworthiness Pc may be determined according to formula (3) as described above. The probability of trustworthiness Pc indicates the likelihood that the router is compromised by visible compromises and/or invisible compromises. Thus, a lower probability of trustworthiness Pc indicates a higher trust degradation score and a higher probability of trustworthiness Pc indicates a lower trust degradation score. The score scale may be set configured into the network controller (e.g., on a scale of 0 to 5, 0 to 10, 0 to 100, etc.). In some embodiments, the trust degradation score may increase over time due to a higher likelihood of attacks over a longer period of time. When the probability of trustworthiness Pc increases to above a threshold probability and/or the trust degradation score falls below a threshold score, the network controller may assign or determine that the router may be compromised or potentially unsafe. In some embodiments, the network controller may flag the router for further review, testing, or validation.

At S612, the network controller may establish, based on the trust degradation score and/or the probability of trustworthiness Pc, a specified type of communication session with the router. In some embodiments, the specified type of communication session may be a scheduled active check to validate the router. Additionally, the network controller may specify the communication session to return the router to a known good state. In some embodiments, the specified type of communication session may be to route network traffic around the router through other nodes or inform other network devices in communication with the router to route their network traffic around the router, when the trust degradation score of the router determined at S610 is below a threshold (which may be a configurable parameter determined based on experiments and/or empirical studies). As discussed above, the routing and/or switching behavior may be adjusted and/or impacted based on the trust degradation score of the router. Thus, when a trust degradation score falls beneath a threshold value, the network controller may establish a communication session that routes sensitive data around and away from the router. With examples of instantaneous measurement of trustworthiness of network devices based on measurable (visible) and non-measurable/not measured (invisible) indicators of possible compromises and attacks on such network devices, described above, the present disclosure now turns to examples of system components and architectures for implementing the controllers and network devices described above including, but not limited to, attestation routing orchestrator 101, source node 402 and/or any one or more of candidate next-hop nodes 108A-108N of FIG. 4.

Figure 7A:
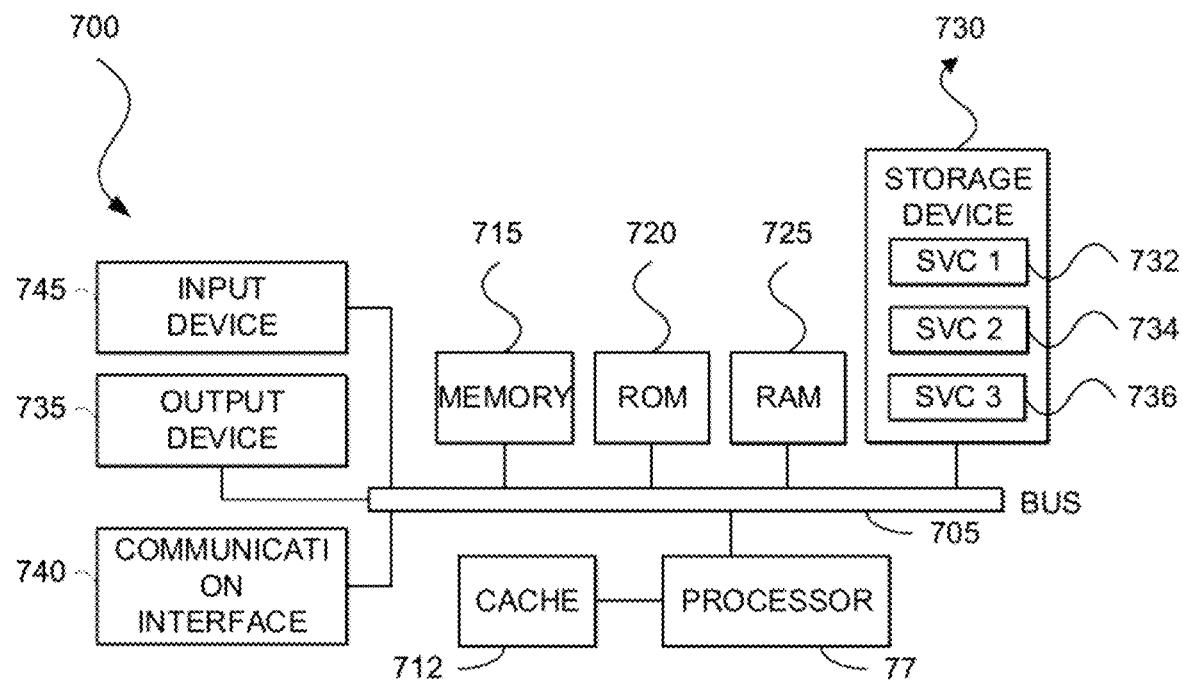
FIGS. 7A and 7B illustrate examples of systems in accordance with some embodiments.
Figure 7B:
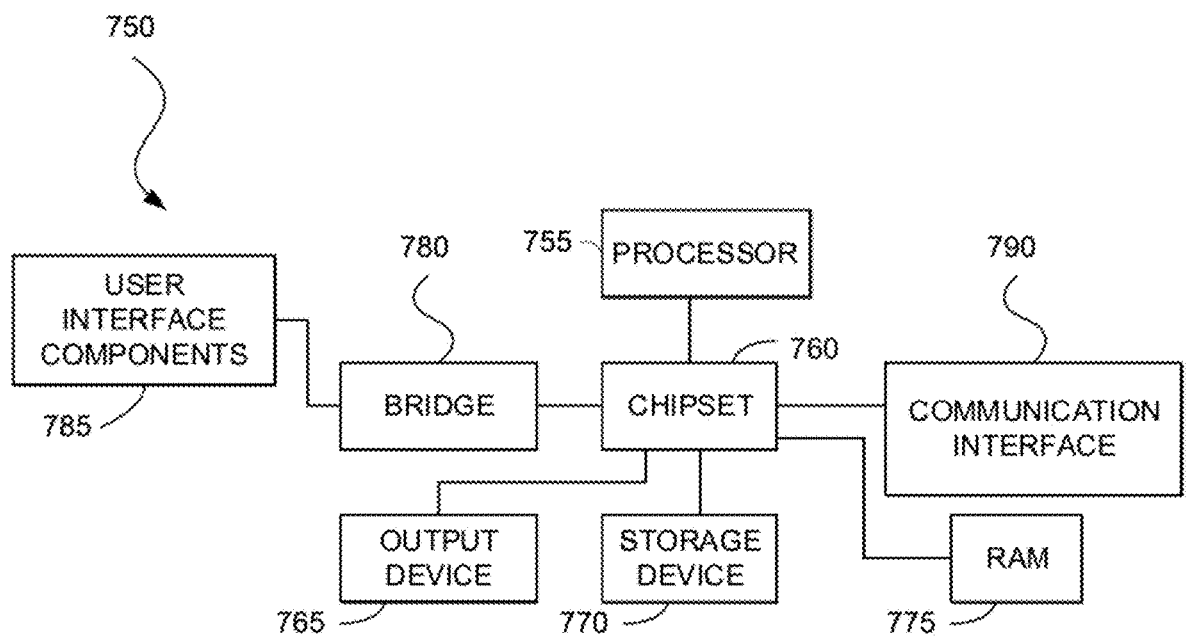

FIGS. 7A and 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example of a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) 720 and random access memory (RAM) 725, to the processor 710. The computing system 700 can include a cache 712 of high-speed memory connected directly with, in close proximity to, or integrated as part of the processor 710. The computing system 700 can copy data from the memory 715, ROM 720, RAM 725, and/or storage device 730 to the cache 712 for quick access by the processor 710. In this way, the cache 712 can provide a performance boost that avoids processor delays while waiting for data. These and other modules can control the processor 710 to perform various actions. Other system memory 715 may be available for use as well. The memory 715 can include multiple different types of memory with different performance characteristics. The processor 710 can include any general purpose processor and a hardware module or software module, such as services (SVC) 1 732, SVC 2 734, and SVC 3 736 stored in the storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

The storage device 730 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 730 can include the software SVCs 732, 734, 736 for controlling the processor 710. Other hardware or software modules are contemplated. The storage device 730 can be connected to the system bus 705. In some embodiments, a hardware module that performs a particular function can include a software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, solid state media, and other suitable storage media. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 755 analyzing data stored in the storage device 770 or the RAM 775. Further, the computing system 750 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

The invention claimed is:

1. A method comprising:
   determining a first probability of a security compromise of a network device based on visible indicators;
   determining a second probability of the security compromise of the network device based on time indicators, wherein the second probability is at least based on a probability of an occurrence of the time indicator over an amount of time since the network device was last verified;
   determining, at least based on one of the first or second probability, a trust degradation score for the network device; and
   determining, based on the trust degradation score, a specified type of communication session with the network device.

2. The method of claim 1, further comprising:
   determining a set of probabilities, each of which corresponds to one of the visible indicators,
   wherein the first probability is based upon the set of probabilities.

3. The method of claim 2, wherein each of the set of probabilities is determined based on past detected compromises after performing one or more measurements of a corresponding one of the visible indicators.

4. The method of claim 1, wherein the visible indicators include one or more detected modifications to at least one of a hardware, an operating system, and one or more applications running on the network device.

5. The method of claim 1, wherein the second probability is based on the probability of the occurrence of the time indicators over the time interval, the amount of time since the network device was last verified and a type of the network device.

6. The method of claim 5, wherein the probability of the occurrence of the time indicators is based partly on historical data of detected compromises.

7. The method of claim 1, wherein the network device is a network controller or a router.

8. A system comprising:
   one or more processors; and
   at least one computer-readable storage medium having stored therein instructions which, when executed by the one or more processors, cause the one or more processors to:
      determine a first probability of a security compromise of a network device based on visible indicators;
      determine a second probability of the security compromise of the network device based on time indicators, wherein the second probability is based on a probability of an occurrence of the time indicators over an amount of time since the network device was last verified;
      determine, at least based on one of the first or second probability, a trust degradation score for the network device; and
      establish, based on the trust degradation score, a specified type of communication session with the network device.

9. The system of claim 8, wherein the instructions, when executed by the one or more processors, further cause the one or more processors to:
   determine a set of probabilities, each of which corresponds to one of the visible indicators,
   wherein the first probability is based upon the set of probabilities.

10. The system of claim 9, wherein each of the set of probabilities is determined based on past detected compromises after performing one or more measurements of a corresponding one of the visible indicators.

11. The system of claim 8, wherein the visible indicators include one or more detected modifications to at least one of a hardware, an operating system, and one or more applications running on the network device.

12. The system of claim 8, wherein the second probability is based on the probability of the occurrence of the time indicators over the time interval, the amount of time since the network device was last verified and a type of the network device.

13. The system of claim 12, wherein the probability of the occurrence of the time indicators based partly on historical data of detected compromises.

14. The system of claim 8, wherein the network device is a network controller or a router.

15. A non-transitory computer-readable storage medium comprising instructions stored therein which, when executed by at least one processor, cause the at least one processor to:
    determine a first probability of a security compromise of a network device based on visible indicators;
    determine a second probability of the security compromise of the network device based on time indicators, wherein the second probability is based on a probability of an occurrence of the time indicators over an amount of time since the network device was last verified;
    determine, at least based on one of the first or second probability, a trust degradation score for the network device; and
    establish, based on the trust degradation score, a specified type of communication session with the network device.

16. The non-transitory computer-readable storage medium of claim 15, wherein the instructions, when executed by the at least one processor, further cause the at least one processor to:
    determine a set of probabilities, each of which corresponds to one of the visible indicators,
    wherein the first probability is based upon the set of probabilities.

17. The non-transitory computer-readable storage medium of claim 16, wherein each of the set of probabilities is determined based on past detected compromises after performing one or more measurements of a corresponding one of the visible indicators.

18. The non-transitory computer-readable storage medium of claim 15, wherein the visible indicators include one or more detected modifications to at least one of a hardware, an operating system, and one or more applications running on the network device.

19. The non-transitory computer-readable storage medium of claim 15, wherein the second probability is based on the probability of the occurrence of the time indicator over the time interval, the amount of time since the network device was last verified and a type of the network device.

20. The non-transitory computer-readable storage medium of claim 19, wherein the probability of the occurrence of the time indicators based partly on historical data of detected compromises.

\* \* \* \* \*